United States Patent
Anders et al.

(10) Patent No.: US 11,175,716 B2
(45) Date of Patent: Nov. 16, 2021

(54) MID-CYCLE ELECTRICITY OUTAGE MONITORING SYSTEM

(71) Applicant: International Business Machines Corporation, Armonk, NY (US)

(72) Inventors: Kelley L. Anders, East New Market, MD (US); Jonathan Dunne, Dungarvan (IE); Jeremy R. Fox, Georgetown, TX (US); Liam S. Harpur, Skerries (IE)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 15/815,916

(22) Filed: Nov. 17, 2017

(65) Prior Publication Data

US 2019/0155360 A1 May 23, 2019

(51) Int. Cl.
| | |
|---|---|
| *G06F 1/3209* | (2019.01) |
| *H04L 12/28* | (2006.01) |
| *G06F 1/30* | (2006.01) |
| *H04L 12/10* | (2006.01) |
| *H04L 12/24* | (2006.01) |

(Continued)

(52) U.S. Cl.
CPC .............. *G06F 1/3209* (2013.01); *G06F 1/24* (2013.01); *G06F 1/28* (2013.01); *G06F 1/30* (2013.01); *G06F 1/3212* (2013.01); *G06F 1/3287* (2013.01); *G08C 17/02* (2013.01); *H04L 12/2803* (2013.01); *H04L 41/0654* (2013.01); *H04L 41/142* (2013.01); *H04L 43/0817* (2013.01); *H04Q 9/00* (2013.01);

(Continued)

(58) Field of Classification Search
CPC ....... G06F 1/3209; G06F 1/30; H04L 41/0654
See application file for complete search history.

(56) References Cited

U.S. PATENT DOCUMENTS 5,585,704 A  *  12/1996  Elzind ................. G05B 19/042
                                              318/446
6,058,355 A     5/2000   Ahmed et al.
(Continued)

OTHER PUBLICATIONS

Adderly, "Reviewing Power Outage Trends,Electric Reliability Indices and Smart Grid Funding", May 2016, Graduate College Dissertations and Theses. 531. (Year: 2016).*

*Primary Examiner* — John E Breene
*Assistant Examiner* — Liam R Casey
(74) *Attorney, Agent, or Firm* — William H. Hartwell (57) ABSTRACT

A method, computer program product, and system for tracking scheduled and unscheduled tasks of devices in case of an electrical power outage is provided. The method includes providing a hub connected to an electrically powered device, where the hub is powered by an uninterruptible power source. The method further includes continually recording data regarding the operational state of the electrically powered device using one or more sensors attached to the electrically powered device. The method further includes tracking progress of tasks associated with the electrically powered device, based on the continual recording of data regarding the operational state of the electrically powered device. The method further includes, upon detecting a power outage followed by a restore of power, identifying an expected activity to resume a task associated with the electrically powered device, based on the tracked progress of the task prior to the power outage.

20 Claims, 7 Drawing Sheets

(51) Int. Cl.

| | | |
|---|---|---|
| *G06F 1/28* | (2006.01) | |
| *H04Q 9/00* | (2006.01) | |
| *G06F 1/3212* | (2019.01) | |
| *G06F 1/3287* | (2019.01) | |
| *G08C 17/02* | (2006.01) | |
| *G06F 1/24* | (2006.01) | |
| *H04L 12/26* | (2006.01) | |

(52) U.S. Cl.
CPC ..... *G08C 2201/10* (2013.01); *G08C 2201/50* (2013.01); *H04L 12/10* (2013.01); *H04Q 2209/30* (2013.01)

(56) References Cited

U.S. PATENT DOCUMENTS

| | | | | |
|---|---|---|---|---|
| 6,061,668 | A * | 5/2000 | Sharrow | G07F 9/002 705/400 |
| 2001/0039460 | A1 * | 11/2001 | Aisa | G05B 19/042 700/17 |
| 2002/0008488 | A1 * | 1/2002 | Pearson | D06F 58/30 318/599 |
| 2002/0087351 | A1 * | 7/2002 | Jo | G06Q 30/0645 705/307 |
| 2006/0041767 | A1 | 2/2006 | Maxwell et al. | |
| 2008/0316004 | A1 * | 12/2008 | Kiko | H04B 3/56 340/12.34 |
| 2009/0013210 | A1 | 1/2009 | McIntosh et al. | |
| 2009/0262642 | A1 | 10/2009 | van Greunen et al. | |
| 2011/0251807 | A1 | 10/2011 | Rada et al. | |
| 2012/0146799 | A1 | 6/2012 | Bell et al. | |
| 2012/0319491 | A1 * | 12/2012 | Borras | H02J 7/00 307/80 |
| 2013/0144451 | A1 * | 6/2013 | Kumar | G05B 13/02 700/291 |
| 2015/0100166 | A1 * | 4/2015 | Baynes | H04L 12/2825 700/278 |
| 2015/0253364 | A1 * | 9/2015 | Hieda | H04Q 9/00 702/62 |
| 2016/0019934 | A1 * | 1/2016 | Mese | G11B 27/30 386/241 |
| 2016/0020997 | A1 | 1/2016 | Hui et al. | |
| 2016/0294211 | A1 * | 10/2016 | Tricarico | H02J 7/0068 |
| 2017/0052515 | A1 * | 2/2017 | Meusburger | F24C 7/08 |
| 2017/0083072 | A1 * | 3/2017 | Dauneria | H04W 24/00 |
| 2017/0105190 | A1 * | 4/2017 | Logan | H04W 4/14 |
| 2017/0105595 | A1 * | 4/2017 | Lambert | G06F 3/14 |
| 2018/0124097 | A1 * | 5/2018 | Tiwari | H04L 63/1433 |
| 2019/0090014 | A1 * | 3/2019 | Shoop | G06F 16/738 |

* cited by examiner

| IoT DEVICE | WASHING MACHINE |
|---|---|
| EXPECTED CYCLE/STAGE | PRE-WASH |
| LIKELY RECOVER TIME | 8990 SECONDS |
| REQUIRES USER INTERVENTION | YES |
| PROXIMATE HUMAN | NO |
| RELATIVE DISTANCE | 26 FEET |
| RELATIVE DISTANCE (PREVIOUS OUTAGE) | 18 FEET |
| RECOMMENDATION | SEND USER NOTIFICATION |
| LIKELY TO BE FIXED OR EVENT SUCCESS | BETWEEN (3 FEET) AND (9 FEET) |
| STATISTICAL LIKELIHOOD | 96% |
| USER ID | USER59 |

MID-CYCLE ELECTRICITY OUTAGE MONITORING SYSTEM

BACKGROUND

The present invention relates generally to the field of power outages, and more particularly to tracking scheduled and unscheduled tasks of devices in case of an electrical power outage.

An electrical grid, also referred to as a power grid, is an interconnected network for delivering electricity to consumers. An electrical grid consists of a plurality of generating stations that produce electrical power that high voltage transmission lines carry to demand centers, and distribution lines that connect individual customers. As electricity became more widespread, larger plants were constructed to satisfy the demand for more electricity, and bigger transmission lines were used to transmit electricity from farther away. As a result, electrical grids have become more complex resulting in instability that leads to power outages.

A power outage, also referred to as a power failure or a blackout, is a disruption to the electrical power to a particular area. A power outage can be a short-term or long-term.

The Internet of Things (IoT) is a system of interrelated computing devices, mechanical/digital machines, and objects that are provided with unique identifiers and the ability to transfer data over a network without requiring human-to-human or human-to-computer interaction.

SUMMARY

Embodiments of the present invention disclose a method, computer program product, and system for tracking scheduled and unscheduled tasks of devices in case of an electrical power outage. The method includes providing a hub connected to an electrically powered device, where the hub is powered by an uninterruptible power source, and where the hub is adapted to monitor one or more sensors attached to the electrically powered device. The method further includes continually recording, by one or more processors of the hub, data regarding the operational state of the electrically powered device using the one or more sensors attached to the electrically powered device. The method further includes tracking, by one or more processors of the hub, progress of one or more tasks associated with the electrically powered device, based on the continual recording of data regarding the operational state of the electrically powered device. The method further includes, upon detecting a power outage followed by a restore of power, identifying, by one or more processors of the hub, an expected activity to resume a task associated with the electrically powered device, based on the tracked progress of the task prior to the power outage.

DETAILED DESCRIPTION

Embodiments in accordance with the present invention recognize that instability within electric grids worldwide leads to power outages. Power outages are typically unannounced to the common homeowner and can cause difficulty in re-starting scheduled and unscheduled tasks of devices and appliances after the power outage has completed.

When electricity power outages occur today, there is a lack of observation and notification(s) for any appliances, tasks, and machines that are running in mid-cycle. For example, certain jobs, tasks, and/or applications may not be able to restart upon regaining electrical power without proper intervention from the user. This creates a problem for users, as it requires that users must always be aware of what is potentially running in case of an unplanned power outage. Without prior knowledge of what is processing (in flight), the user will not be able to manually check and restart any particular machines or devices after the power outage has completed and electricity has been restored.

Figure 1:
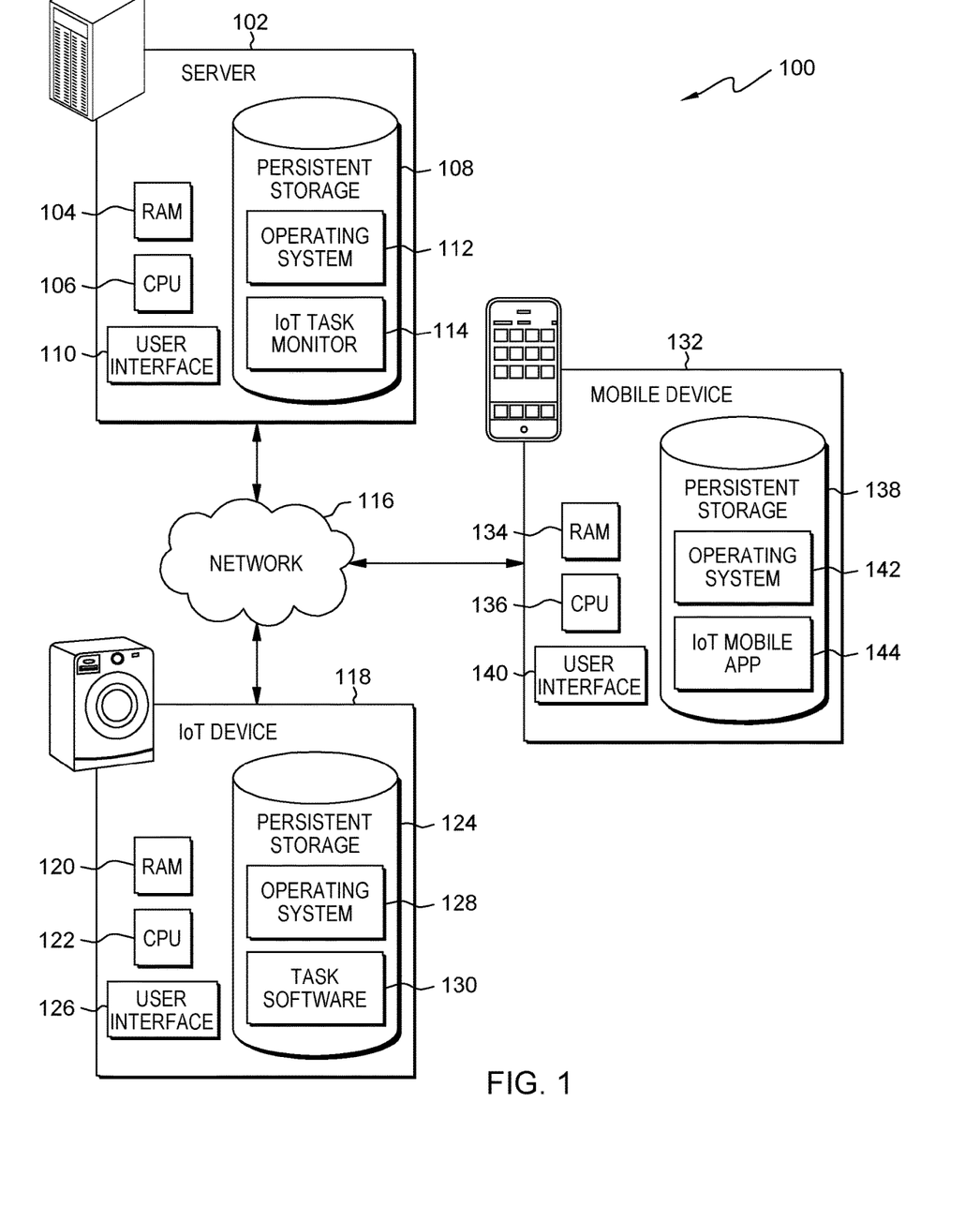
FIG. 1 is a functional block diagram illustrating a task monitoring environment, in an embodiment, in accordance with the present invention.

Embodiments in accordance with the present invention will now be described in detail with reference to the Figures. FIG. 1 is a functional block diagram, generally designated 100, illustrating a task monitoring environment, in an embodiment in accordance with the present invention.

Task monitoring environment 100 includes server 102, IoT device 118, mobile device 132 and other computing devices (not shown), all interconnected over network 116. Server 102 includes random access memory (RAM) 104, central processing unit (CPU) 106, persistent storage 108, and user interface 110. Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, server 102 may represent server computing systems utilizing multiple computers as a server system, such as in a distributed computing environment. In general, server 102 is representative of any electronic device or combinations of electronic devices capable of executing machine-readable program instructions and communicating with IoT device 118 and mobile device 132 via network 116 and with various components and devices (not shown) within task monitoring environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information.

Server 102 includes user interface 110. User interface 110 is a program that provides an interface between a user of server 102 and a plurality of applications that reside on a mobile device (e.g., IoT Mobile App 144) and/or may be accessed over network 116. A user interface, such as user interface 110, refers to the information (e.g., graphic, text, sound) that a program presents to a user and the control sequences the user employs to control the program. A variety of types of user interfaces exist. In one embodiment, user interface 110 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 110 sends and receives information through IoT task monitor 114 to mobile device 132. Server 102 may include internal and external hardware components, as depicted and described in further detail with respect to FIG. 7.

Operating system 112 and IoT task monitor 114 are stored in persistent storage 108. Operating system 112 enables server 102 to communicate with IoT device 118, mobile device 132 and other computing devices (not shown) of task monitoring environment 100 over a data connection on network 116. IoT task monitor 114 includes a computer program, or a set of computer programs, that enables server 102 to monitor all applicable tasks that are both scheduled and unscheduled or that may be occurring when a power outage occurs. Additionally, IoT task monitor 114 can track tasks that are in progress and notify a user when a power outage occurs. In other example embodiments, IoT task monitor 114 can be components of an operating system 112.

In FIG. 1, network 116 is shown as the interconnecting fabric between server 102, IoT device 118, mobile device 132, and with various components and devices (not shown) within task monitoring environment 100. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between server 102, IoT device 118, mobile device 132, and with various components and devices (not shown) within task monitoring environment 100.

IoT device 118 is included in task monitoring environment 100. IoT device 118 includes random access memory (RAM) 120, central processing unit (CPU) 122, persistent storage 124, and user interface 126. IoT device 118 may be a Web server, or any other electronic device or computing system, capable of processing program instructions and receiving and sending data. In some embodiments, IoT device 118 may include one or more components of a laptop computer, a tablet computer, a netbook computer, a personal computer (PC), a desktop computer, a personal digital assistant (PDA), a smart phone, or any programmable electronic device capable of communicating over a data connection to network 116. In other embodiments, IoT device 118 may represent server computing systems utilizing multiple computers as a server system, such as in a distributed computing environment. In general, IoT device 118 is representative of any electronic devices or combinations of electronic devices capable of executing machine-readable program instructions and communicating with server 102 and mobile device 132 via network 116 and with various components and devices (not shown) within task monitoring environment 100.

IoT device 118 includes persistent storage 124. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer-readable storage medium that is capable of storing program instructions or digital information. Operating system 128 and task software 130 are stored in persistent storage 124. Operating system 128 enables IoT device 118 to detect and establish a connection to server 102, mobile device 132, and other computing devices (not shown) of task monitoring environment 100 over a data connection on network 116. Task software 130 are computer programs, or sets of computer programs, that enables IoT device 118 to notify IoT task monitor 114 of one or more scheduled and unscheduled tasks, as well as the status of a task that is in progress.

IoT device 118 includes user interface 126. User interface 126 is a program that provides an interface between a user of IoT device 118 and a plurality of applications that reside on IoT device 118 (e.g., task software 130) and/or may be accessed over network 116. A user interface, such as user interface 126, refers to the information (e.g., graphic, text, sound) that a program presents to a user and the control sequences the user employs to control the program. A variety of types of user interfaces exist. In one embodiment, user interface 126 is a graphical user interface. User interface 126 sends and receives information through task software 130 to server 102. In other embodiments, user interface 126 can send and receive information through task software 130 to mobile device 132. In the example embodiment of FIG. 1, an IoT sensor in IoT device 118 is equipped with an uninterruptable power supply.

Mobile device 132 is included in task monitoring environment 100. Mobile device 132 includes random access memory (RAM) 134, central processing unit (CPU) 136, persistent storage 138, and user interface 140. Mobile device 132 may be a Web server, or any other electronic device or computing system, capable of processing program instructions and receiving and sending data. In some embodiments, mobile device 132 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, mobile device 132 may represent server computing systems utilizing multiple computers as a server system, such as in a distributed computing environment. In general, mobile device 132 is representative of any electronic devices or combinations of electronic devices capable of executing machine-readable program instructions and communicating with server 102 and IoT device 118 via network 116 and with various components and devices (not shown) within task monitoring environment 100.

Mobile device 132 includes persistent storage 138. Persistent storage 138 may, for example, be a hard disk drive. Alternatively, or in addition to a magnetic hard disk drive, persistent storage 138 may include a solid state hard drive, a semiconductor storage device, read-only memory (ROM), erasable programmable read-only memory (EPROM), flash memory, or any other computer-readable storage medium that is capable of storing program instructions or digital information.

Operating system 142 and IoT mobile app 144 are stored in persistent storage 138, as well as software that enables mobile device 132 to communicate with server 102, IoT device 118, and other computing devices (not shown) of task monitoring environment 100 over a data connection on network 116. In other example embodiments, IoT mobile app 144 may be components of an operating system 112.

IoT mobile app 144 is a computer program, or set of computer programs, that is stored in persistent storage 138. IoT mobile app 144 enables a user of mobile device 132 to receive status notifications from IoT task monitor 114 on server 102. For example, upon starting a scheduled task on IoT device 118, task software 130 can notify IoT mobile app 144 on mobile device 132, wherein the notification can indicate the device type, current task, a start time of the current task, number of cycles for the task to complete, length of time of each of the cycles, and an expected end time for the task. In another example embodiment, upon detecting a power outage that affects IoT device 118 during a mid-cycle of a task, IoT task monitor 114 can notify IoT mobile app 144 on mobile device 132 of the power outage, wherein the notification can indicate the device type, current task, a start time of the current task, number of cycles for the task to complete, length of time of each of the cycles, an expected resume time, an indication on whether IoT device 118 will require user intervention when power is restored, and an expected end time for the task if user intervention is not required.

Mobile device 132 includes user interface 140. User interface 140 is a program that provides an interface between a user of mobile device 132 and a plurality of applications that reside on mobile device 132 (e.g., IoT mobile app 144), and/or applications on computing devices that may be accessed over a data connection on network 116 (e.g., IoT task monitor 114 on server 102 and task software 130 on IoT device 118). A user interface, such as user interface 140, refers to the information (e.g., graphic, text, sound) that a program presents to a user and the control sequences the user employs to control the program. User interface 140 is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. For example, the actions in GUIs are often performed through direct manipulation of the graphical elements. A variety of types of user interfaces exist. In one embodiment, user interface 140 is a GUI. In another embodiment, user interface 140 may be a web user interface (WUI) and can display text, documents, web browser user interface, user options, application interfaces, and instructions for operation, and includes the information (such as graphic, text, and sound) that a program presents to a user and the control sequences the user employs to control the program. User interface 140 may also be mobile application software that provides an interface between a user of mobile device 132 and other computing devices over a data connection on network 116.

Mobile application software, or an "app," is a computer program designed to run on smart phones, tablet computers and other computing devices (not shown) of task monitoring environment 100. User interface 140 enables a user of mobile device 132 to schedule one or more tasks for IoT device 118. For example, a user of mobile device 132 can use user interface 140 to schedule a task using task software 130 on IoT device 118, wherein the task is scheduled to begin at 9:00 AM. A user can additionally set one or more parameters for the task on IoT device 118 that indicate whether or not to send status notifications via IoT task monitor 114 or directly to IoT mobile app 144. For example, the user can indicate to only receive a notification when the task is complete and/or if a power outage occurs.

Figure 2:
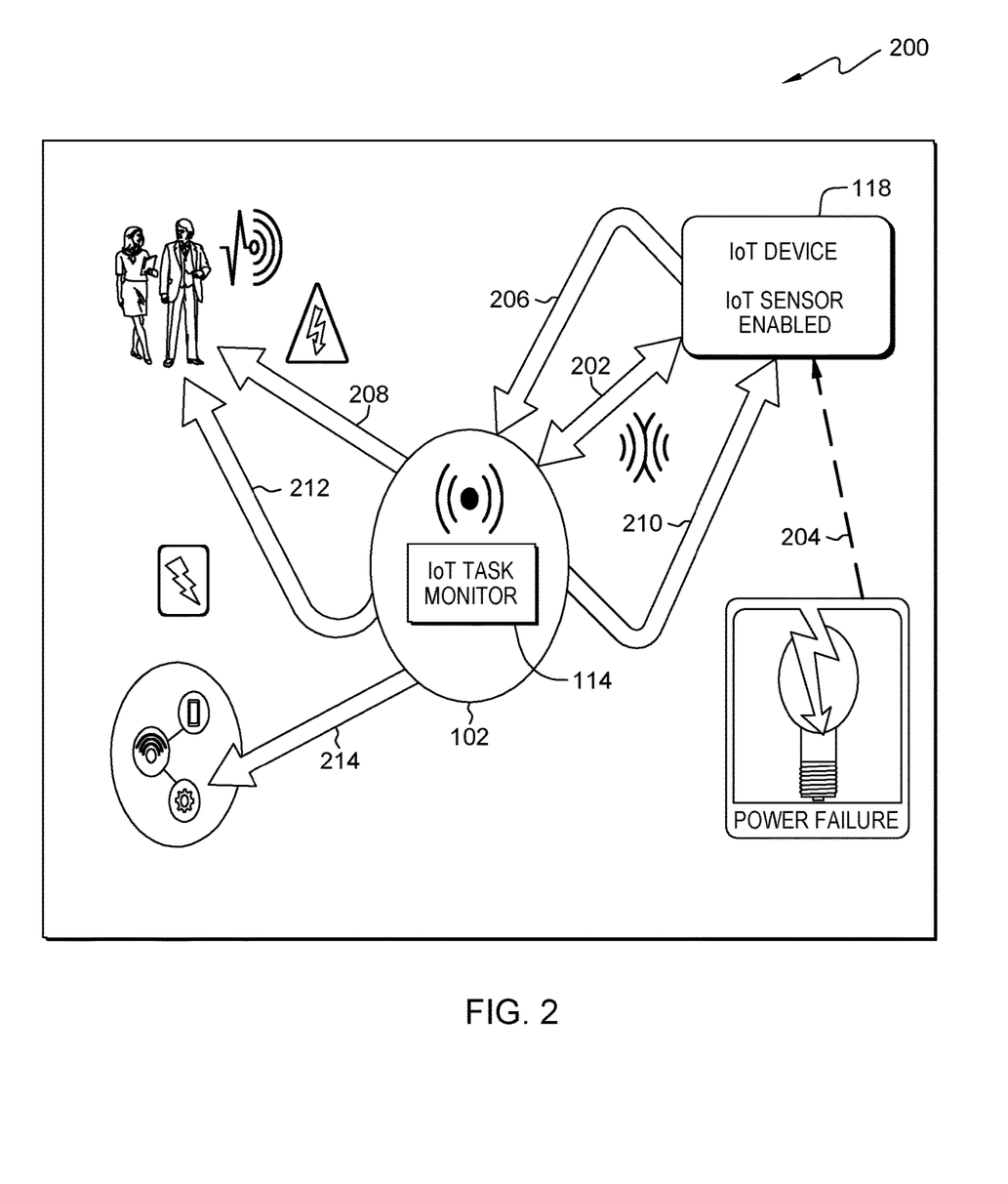
FIG. 2 is an illustration depicting operational steps of an IoT task monitor in a task monitoring environment, in an embodiment, in accordance with the present invention.

FIG. 2 is an illustration, generally designated 200, depicting operational steps of an IoT task monitor 114 in task monitoring environment 100, in an embodiment in accordance with the present invention. In an example embodiment, IoT task monitor 114 is configured on server 102 to monitor a location—such as a home or business—of task monitoring environment 100. In one example embodiment, server 102 can reside in the home or business and be equipped with an uninterruptable power source (UPS) to prevent loss of data or operations during an unplanned electrical event such as a power outage. In another example embodiment, IoT task monitor 114 can be a Cloud service and monitor a home or business of task monitoring environment 100. In other example embodiments, IoT task monitor 114 can be contained in a hub attached to an electrically powered device, such as IoT device 118, wherein the hub is powered by an uninterruptible power source.

IoT task monitor 114 establishes communications with an IoT device 118, wherein IoT device 118 includes one or more IoT sensors that can detect and transmit operational states, configured settings, and conditions to IoT task monitor 114 as indicated by reference indicator 202. Additionally, a user (e.g., administrator), can configure IoT task monitor 114 to send notifications to one or more devices, such as a smartphone, table computer, or smart watch.

Upon detecting a new task (e.g., a new job), IoT device 118 notifies IoT task monitor 114 that new job has been started, or scheduled, and identifies the initial stage. For example, upon starting a new task by a user or by a previously scheduled task, IoT device 118 informs IoT task monitor 114 that the new job has been started, and is in an initial stage. As the task progresses, IoT device 118 transmits notifications to IoT task monitor 114 of staging or cycling status as indicated by reference indicator 202. For example, IoT task monitor 114 can receive notifications from one or more configured IoT devices of task monitoring environment 100 and store the real-time status, cycle, or stage for each of the one or more IoT devices.

As depicted by reference indicator 204, an electricity event (e.g., a power failure), occurs causing one or more IoT devices to stop mid-cycle, or to halt and abort current executing tasks. For example, as a result of the power failure, an IoT enabled wash machine stops mid-cycle. IoT task monitor 114 identifies an expected activity within the normal pattern for the new job (e.g. expected 1 hour of alternating hot and cold cycles from the IoT sensor of the IoT enabled washing machine), however, the next expected update notification has not occurred. In other example embodiments, IoT task monitor 114 can determine a lost connection to IoT device 118 via a transmission control protocol (TCP) keepalive feature. TCP keepalive is a message sent by one networking device to another to check that the link, or connection, between the two devices is operating, or to prevent the link from being broken. Devices, or hosts, that support TCP keepalive periodically send a TCP packet to a peer which solicits a response. After a certain number of keepalives are sent with no response, also referred to as an acknowledge (ACK), being received, then the sending host will terminate the connection from its end. In yet another example embodiment, server 102 can inform IoT task monitor 114 upon losing power and switching over to a UPS. For example, upon losing power, server 102 can detect that the UPS has been enabled and inform IoT task monitor 114.

IoT task monitor 114 captures the state of the one or more IoT enabled devices at the time of the detected power outage as depicted by reference indicator 206. For example, IoT task monitor 114 can retrieve the stored real-time status of the one or more IoT enabled devices. IoT task monitor 114 then records data on the one or more IoT enabled devices that are affected by the power outage and marks, or indicates, which IoT enabled devices cannot recover without human intervention. For example, IoT task monitor 114 indicates that a certain IoT enabled device (e.g., a dryer), will require a human to press a start button once power is restored.

IoT task monitor 114 creates a summary notification that lists the one or more IoT enabled devices, and indicates which IoT devices will require human intervention, and transmits the summary notification to a user as depicted by reference indicator 208. For example, IoT task monitor 114 indicates that a power outage has affected a plurality of IoT enabled devices at a certain time of day. Furthermore, IoT task manager indicates the affected IoT enabled devices that will require user intervention, such as a washing machine, pool pump, and a microwave. Additionally, IoT task monitor 114 can indicate one or more IoT enabled devices that are unaffected by the power outage, such as a refrigerator, a freezer, lights, and a heating/cooling HVAC system.

Upon detecting that power is restored, IoT task monitor 114 reestablishes connections to the one or more IoT sensors of the one or more IoT devices as depicted by reference indicator 210. For example, upon receiving an indication that server 102 is no longer running on the UPS and power has been restored, IoT task manager 114 reestablishes connections to the one or more IoT enabled devices (e.g., IoT device 118), and determines the states of each IoT enabled device via one or more IoT enabled sensors. IoT task manager 114 then determines if a human became involved with IoT device 118 during the power outage by comparing the current state with the last stored real-time state before the power outage. IoT task monitor 114 then restarts the previous cycle for each IoT enabled device. For example, IoT task manager 114 can reset clocks, timers, and previous cycles based on the last stored real-time state of the IoT device. If IoT task monitor 114 cannot restart the previous task for an IoT device, the affected IoT device is flagged in another summary message that for the user as depicted by reference indicator 212. For example, IoT task manager 114 creates another summary notification to inform the user that power has been restored. IoT task monitor 114 then indicates which IoT enabled devices have been restarted and which IoT enabled devices now require human intervention in order to resume one or more tasks.

IoT task monitor 114 then determines cognitive trends using data analytics and statistical modeling as depicted by reference indicator 214. For example, using the recorded data on all IoT enabled devices that are affected by electrical power outages. IoT task monitor 114 can report trends to the user, such as common times during the day when power outages frequently occur, one or more times during the day where power outages are least likely to occur, and one or more IoT enabled devices that frequently cannot recover without human intervention when a power outage occurs. IoT task manager 114 can then utilize statistical modeling with cognitive learning to determine if certain machines and jobs can run at a better, or best, time of day based on time and electrical power outage pattern analysis. In another example embodiment, IoT task monitor 114 can use an adaptive multi-task learning system for survival analysis (MTLSA). Survival analysis is defined as a set of methods for analyzing data (e.g., IoT sensor data for scheduled and unscheduled tasks on one or more IoT enabled devices), where the outcome variable is the time until the occurrence of an event of interest (e.g., a power outage). It should be noted that this learning system out performs non survival-based systems due to the domain specific data types.

Figure 3:
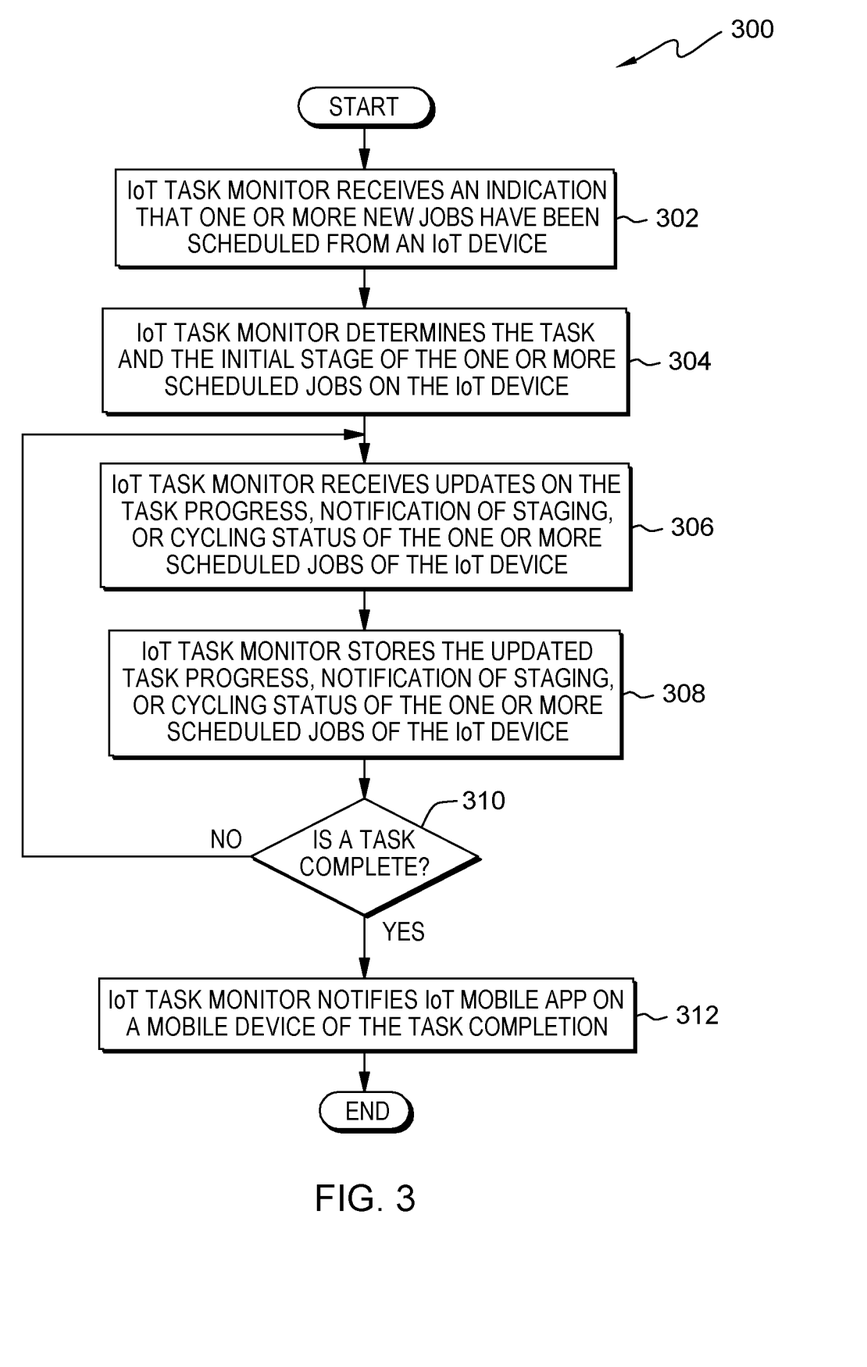
FIG. 3 is a flowchart depicting operational steps of an IoT task monitor, on a server within the task monitoring environment of FIG. 1, for monitoring one or more tasks of an IoT device, in an embodiment, in accordance with the present invention.

FIG. 3 is a flowchart, generally designated 300, depicting operational steps of an IoT task monitor, on a server within the task monitoring environment of FIG. 1, for monitoring one or more tasks of an IoT device, in an embodiment in accordance with the present invention. In one example embodiment, a user starts an unscheduled task on IoT device 118. For example, a user places laundry in IoT device 118 and using user interface 126, selects a wash cycle and presses a start button. In another example embodiment, the user can place the laundry in IoT device at a previous time (e.g., the night before), and can use IoT mobile app 144 on mobile device 132 to remotely start a wash cycle.

IoT task monitor 114 receives an indication that one or more new jobs have been scheduled from an IoT device 118 as depicted in step 302. For example, in response to the user pressing the start button on user interface 126, task software 130 notifies IoT task monitor 114 of the started task. In another example embodiment, task software 130 can notify IoT task monitor 114 of all states or activity occurring on IoT device 118. For example, task monitor can inform IoT task monitor 114 when laundry is placed into IoT device 118. IoT task monitor 114 can then receive indications of what buttons are being pressed on user interface 126.

In step 304, IoT task monitor 114 determines the task and the initial stage of the one or more scheduled jobs on IoT device 118. For example, IoT task monitor 114 analyzes the received notification from task software 130 on IoT device 118 and determines, for each of the scheduled jobs, a device type, a selected task (e.g., wash cycle, mode of operation, or selected setting), a start time of the selected task, a number of cycles for the task to complete, a length of time of each of the cycles, and an expected end time for each of the scheduled jobs. In the example embodiment of FIG. 3, IoT task monitor 114 can determine that the user manually started a wash cycle on IoT device 118 and that the load size is set to small. Additionally, IoT task monitor 114 can analyze the received indication to determine the current state of the current task, wherein the water temperature selection is set to "hot water" for a wash cycle and "cold water" for a rinse cycle. In other example embodiments, IoT task monitor 114 can access one or more IoT sensors (not shown) of IoT device 118 to determine one or more scheduled and unscheduled tasks, where the task is comprised of a wash cycle, a load size of the laundry, a water temperature setting, a start time of the task, and a completion time of the task.

IoT task monitor 114 receives updates on the task progress, notification of staging, or cycling status of the one or more scheduled jobs of IoT device 118 as depicted in step 306. For example, IoT task monitor 114 can continually receive notifications on the status of the current task from task software 130, wherein the updated notification indicates the current wash cycle of the task, a load size of the laundry, a water temperature setting (e.g., hot for wash and cold for rinse), a start time of the task, a completion time for the current cycle, and a completion time of the entire task. In other example embodiments, IoT task monitor 114 can determine the status of the current task using one or more IoT sensors in IoT device 118. For example, IoT task monitor 114 can access one or more IoT sensors of IoT device 118 to determine the current wash cycle of the task, a load size of the laundry, a water temperature setting (e.g., hot for wash and cold for rinse), a start time of the task, a completion time for the current cycle, and a completion time of the entire task. Additionally, IoT task monitor 114 can determine, via an IoT sensor, whether the user forgot to add fabric softener in a fabric softener dispenser when starting the current task (e.g., wash cycle).

In step 308, IoT task monitor 114 stores the updated task progress, notification of staging, or cycling status of the one or more scheduled jobs of IoT device 118. For example, IoT task monitor 114 stores the updated notification in persistent storage 108, wherein the updated notification can indicate, or reflect, the current wash cycle of the task, a load size of the laundry, a water temperature setting (e.g., hot for wash and cold for rinse), a start time of the task, a completion time for the current cycle, and a completion time of the entire task.

In decision step 310, IoT task monitor 114 determines if a current task has completed. For example, IoT task monitor 114 analyzes the received updated notification to determine the current stage in the cycle. In another example embodiment, IoT task monitor 114 can access one or more IoT sensors on IoT device 118 to determine the status of the current wash cycle. If IoT task monitor 114 determines that a current task has not completed ("No" branch, decision step 310), IoT task monitor 114 repeats steps 306 and 308 as depicted in FIG. 3. If IoT task monitor 114 determines that a current task has completed ("Yes" branch, decision step 310), IoT task monitor 114 notifies IoT mobile app 144 on mobile device 132 of the task completion as depicted in step 312. For example, IoT task monitor 114 creates a summary message to transmit to IoT mobile app 144 on mobile device 132, wherein the summary message can contain, but not limited to, the following: an identification of the device (e.g., IoT device 118), a task identifier (e.g., the completed wash cycle or wash selection), a time of day the task was scheduled to run, a time of day the task was started, a length of time the task required to complete, and a time of day the task completed.

Figure 4:
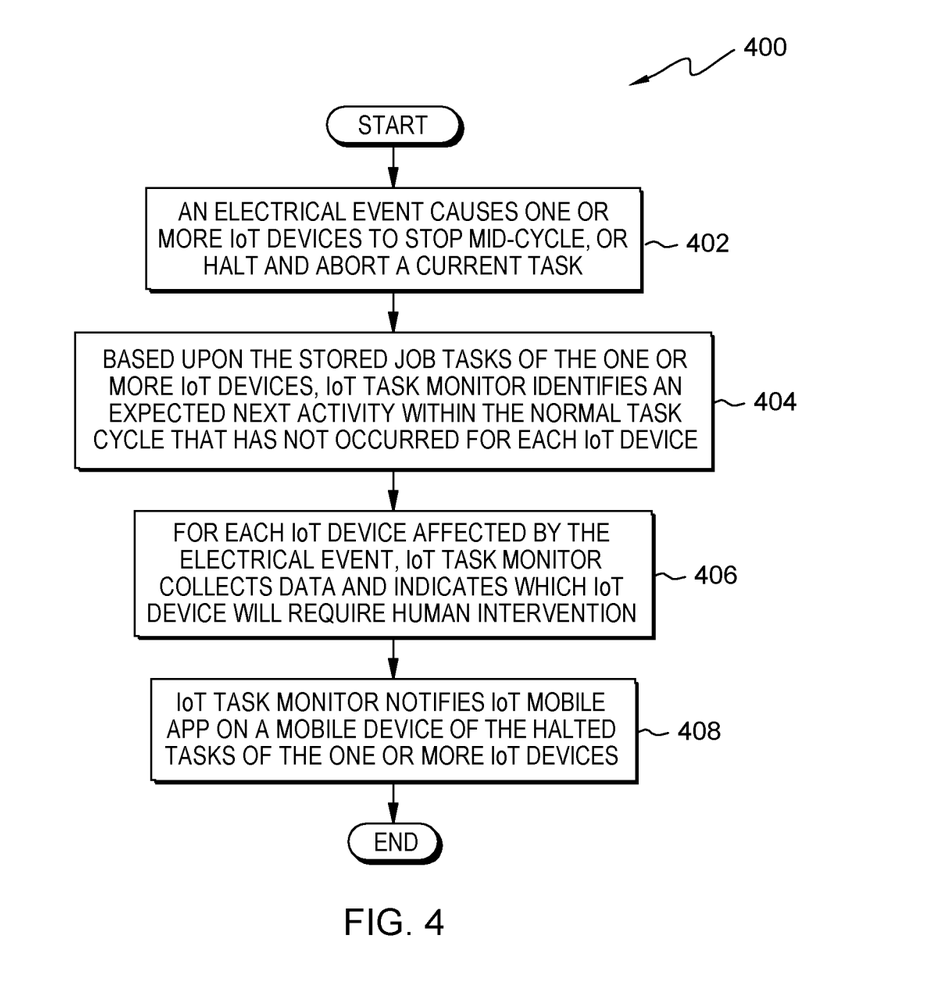
FIG. 4 is a flowchart depicting operational steps of an IoT task monitor, on a server within the task monitoring environment of FIG. 1, for detecting a power outage that affects one or more IoT devices, in an embodiment in accordance with the present invention.

FIG. 4 is a flowchart, generally designated 400, depicting operational steps of an IoT task monitor 114, on a server within the task monitoring environment of FIG. 1, for detecting a power outage that affects one or more IoT devices, in an embodiment in accordance with the present invention. Continuing the example embodiment of FIG. 3, IoT device 118 is currently executing a task and updating IoT task monitor 114 with update notifications to enable IoT task monitor to track the progress of the executing task. An electrical event causes one or more IoT devices to stop mid-cycle, or halt and abort a current task as depicted in step 402. For example, an unexpected power outage occurs causing IoT device 118 to stop in mid-cycle.

In step 404, based upon the stored job tasks of the one or more IoT devices, IoT task monitor 114 identifies an expected next activity within the normal task cycle that has not occurred for each IoT device. For example, based on the stored wash cycle of IoT device 118, IoT Monitor 114 expects a next cycle to begin within a certain time period from the last received update notification. For example, IoT task monitor 114 last received an update notification from task software 130 indicating a wash cycle had begun on IoT device 118. Based on previous updates from past tasks of the same selected wash settings, IoT task monitor expects an update indicating a rinse cycle has begun on IoT device 118 in ten minutes. Upon passing the time limit to receive the update notification can then try to read one or more IoT sensors on IoT device to determine the status of the current wash cycle.

For each IoT device affected by the electrical event, IoT task monitor 114 collects data and indicates which IoT device will require human intervention as depicted in step 406. For example, IoT task monitor 114 records data on all devices that are affected by the power outage and indicates one or more devices that cannot automatically recover without human intervention. Continuing with the previous example embodiment, IoT task monitor determines if IoT device 118 can be restarted at the previous state or cycle that was in progress when the power outage occurred. If IoT task monitor 114 is unable to restart IoT device 118 at the previous state or cycle, IoT device 118 is indicated as requiring human intervention.

IoT task monitor 114 notifies IoT mobile app 144 on mobile device 132 of the halted tasks of the one or more IoT devices as depicted in step 408. For example, IoT task monitor 114 creates a summary message to inform the user of IoT device 118 that a power outage has occurred that will affect one or more devices. For example, the summary message can identify IoT device 118 and a plurality of other IoT enabled devices such as a pool pump, a microwave, a kitchen oven, and a coffee machine. Additionally, IoT task monitor 114 can identify one or more devices that will not be affected by the power outage. For example, the summary message can identify a plurality of other IoT enabled devices such as a refrigerator, a freezer, lights not on a timer, and a cooling and heating HVAC system, that will not be affected by the power outage. In addition to identifying one or more affected and non-affected devices of the power outage, IoT task monitor 114 can indicate one or more of the affected devices that will require user intervention to resume the previous operation.

Figure 5:
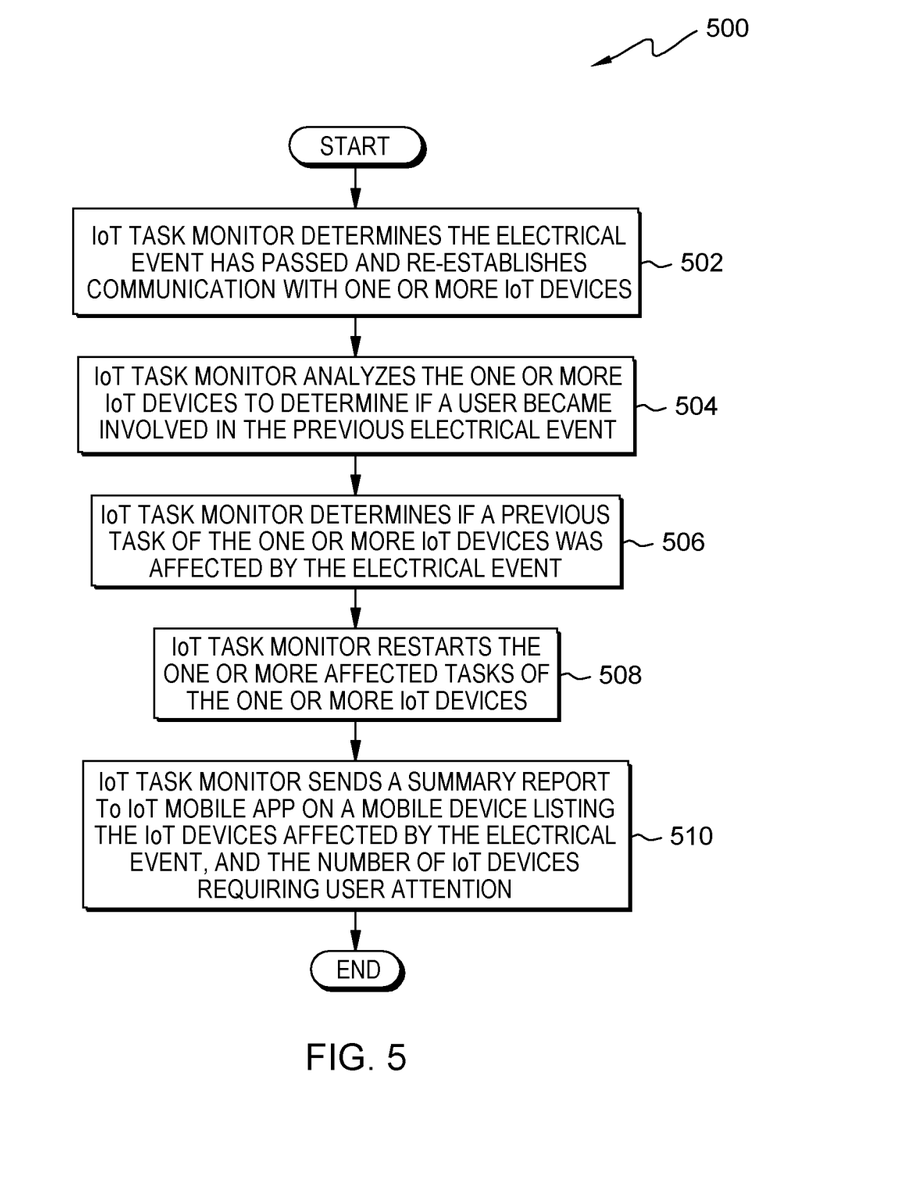
FIG. 5 is a flowchart depicting operational steps of an IoT task monitor, on a server within the task monitoring environment of FIG. 1, for resuming one or more tasks on one or more IoT devices once power is restored, in an embodiment, in accordance with the present invention.

FIG. 5 is a flowchart, generally designated 500, depicting operational steps of an IoT task monitor, on a server within the task monitoring environment of FIG. 1, for resuming one or more tasks on one or more IoT devices once power is restored, in an embodiment in accordance with the present invention. Continuing with the previous example embodiment, IoT task manager 114 determines IoT device 118 has experienced a power outage mid-cycle into a task. Upon notifying a user of mobile device 132 that IoT device 118 experienced a power outage, and after a certain amount of time has passed, IoT task monitor 114 determines the electrical event has passed and re-establishes communication with one or more IoT devices as depicted in step 502. For example, upon power being restored to IoT device 118, task software 130 re-establishes communication to IoT task monitor 114 and transmits information from one or more IoT sensors within IoT device 118. In one example embodiment, upon detecting that power has been restored to IoT device 118, IoT task monitor 114 is able to reset a clock that is displayed on user interface 126 of IoT device 118.

In step 504, IoT task monitor 114 analyzes the one or more IoT devices to determine if a user became involved in the previous electrical event. For example, IoT monitor 114 analyzes the received information from task software 130 and the one or more IoT sensors to determine the current state of IoT device 118 and if a user became involved during the electrical event. For example, IoT task manager 114 determines if a user changed the state of the machine in any way during the power outage. For example, a user may have decided to remove the wet clothes and take them to a Laundromat. In another example embodiment, IoT task monitor 114 determines that the previous state was a wash cycle that did not complete and one or more IoT sensors indicate that water is still in the tub. Additionally, a user checked the state of IoT device 118 during the power outage and left the lid open.

IoT task monitor 114 determines if a previous task of the one or more IoT devices was affected by the electrical event as depicted in step 506. For example, IoT task monitor 114 determines that the previous state was a wash cycle that did not complete and one or more IoT sensors indicate that water is still in the tub. In other example embodiment, IoT task monitor 114 compares the current state of IoT device 118 to the last stored state before the power outage. For example, IoT task monitor 114 retrieves the last stored state of the reported task from task software 130 and compares it to information received once power is restored from task software 130 and the one or more IoT sensors in IoT device 118.

In step 508, IoT task monitor 114 restarts the one or more affected tasks of the one or more IoT devices. For example, IoT task monitor 114 can instruct task software 130 to resume the wash cycle for the remaining wash cycle at the moment power was lost. In other example embodiments, IoT task monitor 114 can take the length of time power was lost into consideration when determining to resume the wash cycle. For example, if the wash cycle had only two minutes remaining when IoT device 118 lost power, and the power outage lasted for an hour, IoT task monitor 114 can instruct task software to begin the next cycle in the task (e.g., rinse cycle).

IoT task monitor 114 sends a summary report to IoT mobile app 144 on mobile device 132 listing the IoT devices affected by the electrical event, and the number of IoT devices requiring user attention as depicted in step 510. For example, IoT task monitor 114 creates a summary message identifying IoT device 118 and a plurality of other IoT enabled devices such as a pool pump, a microwave, a kitchen oven, and a coffee machine. Furthermore, IoT task monitor 114 indicates in the summary message that IoT device 118 requires user intervention to continue operating as depicted in FIG. 6.

Figure 6:
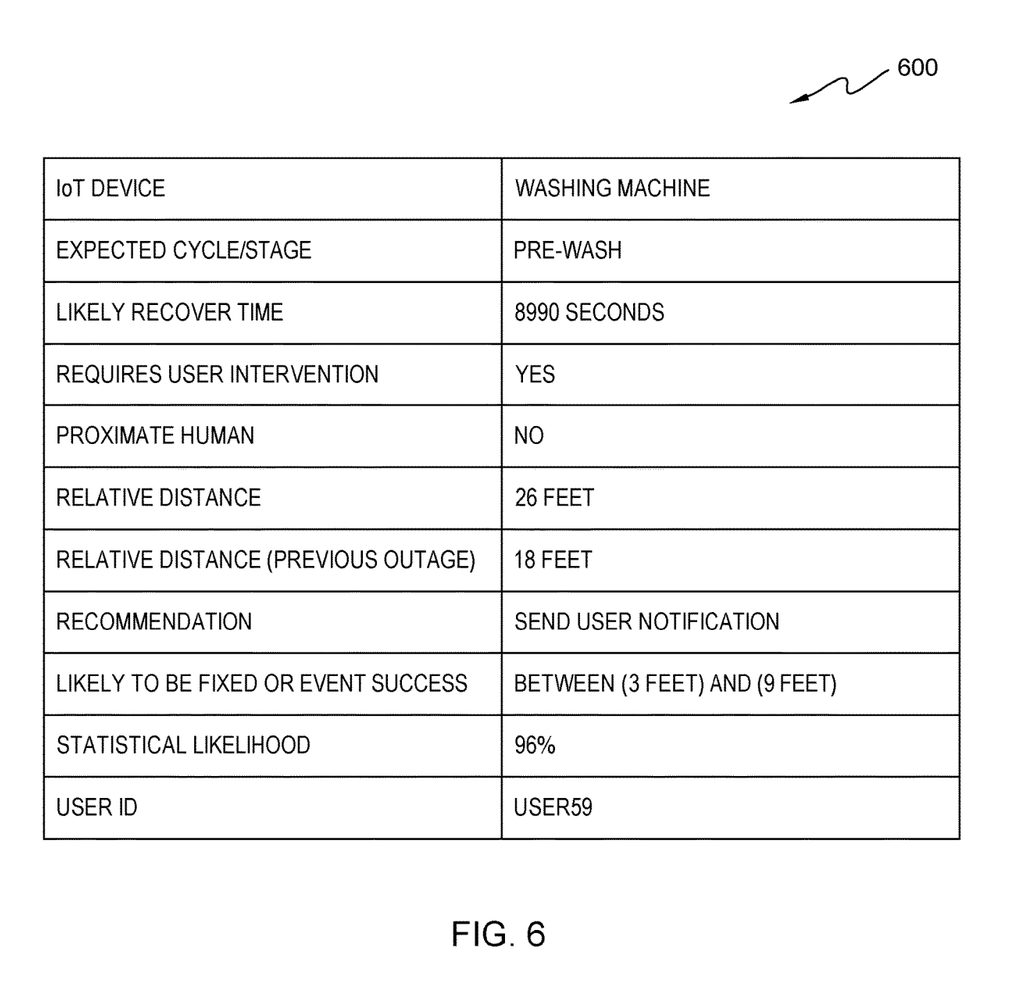
FIG. 6 is an illustration of an example of a summary notification sent to a user, in an embodiment, in accordance with the present invention.

FIG. 6 is an illustration, generally designated 600, of an example of a summary notification sent to a user, in an embodiment, in accordance with the present invention. It should be appreciated that FIG. 6 provides only an illustration of one implementation and does not imply any limitations with regard to the environments in which different embodiments may be implemented. Many modifications to the depicted summary notification may be made. In the example embodiment of FIG. 6, IoT task monitor 114 identifies: the affected IoT device as a "washing machine"; the expected cycle/stage before the power outage occurred; a likely recover time that the power can be returned; a requirement of user intervention; a proximate human (e.g., if a human is nearby, adjacent, or within a certain proximity); a relative distance from the user of mobile device 132; a relative distance of the user of mobile device 132 during the previous power outage; a notification recommendation; a likeliness of being fixed or event success (e.g., a probability that the issue will be resolved or the event will succeed); a statistical likelihood (e.g., a probability); and a user identification (ID). In other example embodiments, IoT task monitor 114 can indicate "Washer lid is open. Please close lid to continue." in the summary message.

In another example embodiment, IoT task monitor 114 can track an IoT enabled pool water pump. For example, IoT task monitor can establish a connection to one or more IoT sensors of a pool pump to received notifications on scheduled activity. For example, the pool pump can be scheduled to run during a certain time of day (e.g., 9:00 AM to 10:00 PM). Upon experiencing a power outage, which causes the pool pump to miss a scheduled start time, IoT task monitor 114, once reestablishing a connection to the IoT sensor of the pool pump, can reset the current time of day. Upon resetting the current time of day, IoT task monitor 114 can retrieve the last transmitted schedule of the pool pump, stored in persistent storage 108, and determine that the pool pump would normally be at the current time of day. IoT task monitor can then start the pool pump for the remainder of the scheduled run time of the day.

In another example embodiment, IoT task monitor 114 can track an unscheduled task such as an IoT enabled night light that must be manually turned ON/OFF by pressing a push button. Upon experiencing a power outage, which causes the IoT enabled night light to lose power and therefore not be turned on when power is restored, IoT task monitor 114 can notify a user of mobile device 132 that the night light will have to be manually turned on again. Additionally, IoT task monitor 114 can determine that turning on the night light occurs daily at 8:00 PM. Upon accessing one or more IoT sensors of the night light and detecting that a person is in bed, but that the night light was not turned on, IoT task monitor 114 can then notify IoT mobile app 144, on mobile device 132, to remind the user to manually turn on the night light.

In another example embodiment, IoT task monitor can track an IoT enabled coffee maker. Upon detecting an unplanned power outage, IoT task monitor 114 notifies a user of mobile device 132 of the power outage and the affected coffee machine. For example, IoT task monitor 114 can create a summary notification that identifies the IoT enabled coffee maker, the time of day the power outage occurred, and suggest an alternate source for coffee on the commute to work for the user of mobile device 132. In another example embodiment, upon power being restored to the IoT enabled coffee maker, IoT task monitor 114 can reprogram the IoT enabled coffee maker with the last received schedule stored in persistent storage 108.

In another example embodiment, a hub can be connected to IoT device 118, wherein the hub is powered by an uninterruptible power source (UPS), and wherein the hub can perform the steps described by the present invention. For example, a hub powered by a UPS can be attached to an electrically powered appliance, such as IoT device 118, and monitor one or more IoT sensors to determine and track all applicable tasks that are both scheduled and unscheduled or that may be occurring. The attached hub can continually record data regarding the operational state of the electrically powered device using the one or more sensors attached to the electrically powered device. For example, the attached hub can record and store the current state of IoT device 118 and anticipate a next state regarding to the scheduled and unscheduled tasks. For example, the attached hub can detect that a user started an unscheduled task (e.g., a wash cycle on IoT device 118). The attached hub can track the progress of one or more tasks associated with the electrically powered device, based on the continual recording of data regarding the operational state of the electrically powered device. For example, the attached hub can determine the IoT device is currently in a wash cycle, and the current wash cycle will end in three minutes wherein the next cycle (e.g., spin cycle) will begin. Upon detecting a power outage followed by a restore of power, the attached hub can identify an expected activity to resume a task associated with the electrically powered device, based on the tracked progress of the task prior to the power outage. For example, upon detecting that power has been restored to IoT device 118, the attached hub can instruct IoT device to resume the remainder of the wash cycle prior to the power outage, then begin the next cycle in the job (e.g., the spin cycle). In addition, the attached hub can notify a user of mobile device 132 of the status of IoT device 118 throughout the scheduled and unscheduled tasks, as well as during a detected power outage to inform the user of any required user intervention.

Figure 7:
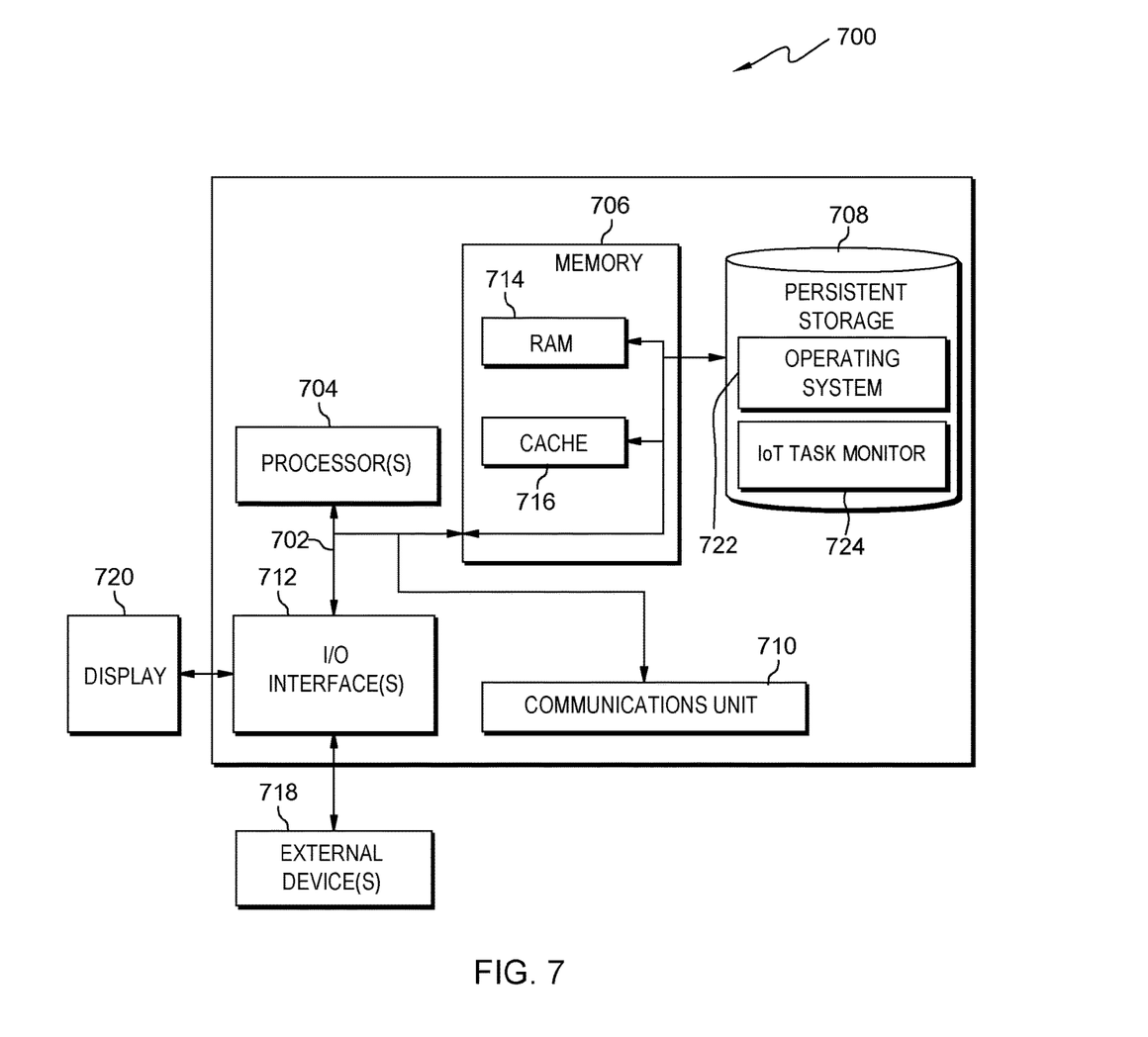
FIG. 7 depicts a block diagram of components of the server executing the IoT task monitor, in an embodiment in accordance with the present invention.

FIG. 7 depicts a block diagram, generally designated 700, of components of the server executing the IoT task monitor, in an embodiment in accordance with the present invention. It should be appreciated that FIG. 7 provides only an illustration of one implementation and does not imply any limitations with regard to the environments in which different embodiments may be implemented. Many modifications to the depicted environment may be made.

Server 102 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Operating system 722 and IoT task monitor 724 are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of network 116 IoT device 118 and mobile device 132. In these examples, communications unit 710 includes one or more network interface cards. Communications unit 710 may provide communications through the use of either or both physical and wireless communications links. Operating system 722 and IoT task monitor 724 may be downloaded to persistent storage 708 through communications unit 710.

I/O interface(s) 712 allows for input and output of data with other devices that may be connected to server 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., operating system 722 and IoT task monitor 724, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Automatically" means without any human intervention.

What is claimed is:

1. A computer-implemented method comprising:
providing a hub connected to an electrically powered device, wherein the hub is powered by an uninterruptible power source, and wherein the hub is adapted to monitor one or more sensors attached to the electrically powered device;
continually recording, by one or more processors of the hub, data regarding the operational state of the electrically powered device using the one or more sensors attached to the electrically powered device;
tracking, by one or more processors of the hub, progress of one or more tasks associated with the electrically powered device, based on the continual recording of data regarding the operational state of the electrically powered device;
upon detecting a power outage followed by a restore of power, identifying, by one or more processors of the hub, an expected activity to resume a task associated with the electrically powered device, based on the tracked progress of the task prior to the power outage;
instructing, by one or more processors of the hub, the electrically powered device to perform the expected activity to resume the task;
determining, by one or more processors of the hub, trends relating to the electrically powered device using data analytics and statistical modeling, wherein the trends include times during the day when power outages frequently occur, times during the day when power outages are least likely to occur, and whether the electrically powered device is able to automatically recover from power outages without human intervention;
performing, by one or more processors of the hub, a survival analysis to identify an amount of time until an occurrence of a power outage for the electrically powered device;
determining, by one or more processors of the hub, a best time of day for the electrically powered device to operate, based, at least in part, on the determined trends; and
scheduling, by one or more processors of the hub, the electrically powered device to operate at the determined best time of day.

2. The computer-implemented method of claim 1, wherein the data regarding the operational state of the electrically powered device includes: a device type of the electrically powered device, a selected mode of operation of the electrically powered device, a start time of a selected task of the one or more tasks, and an expected end time for the selected task.

3. The computer-implemented method of claim 1, wherein tracking, by the hub, progress of one or more tasks associated with the electrically powered device, based on the continual recording of data regarding the operational state of the electrically powered device comprises:
detecting, by one or more processors of the hub, a scheduled or unscheduled task on the electrically powered device;
monitoring, by one or more processors of the hub, updated data relating to a status of the scheduled or unscheduled task; and
in response to determining that the updated data relating to the status of the scheduled or unscheduled task is different from stored data relating to the status of the scheduled or unscheduled task, updating, by one or more processors of the hub, the stored data relating to the status of the scheduled or unscheduled task to reflect the updated data.

4. The computer-implemented method of claim 1, wherein identifying, by the hub, an expected activity to resume a task associated with the electrically powered device, based on the tracked progress of the task prior to the power outage comprises:
identifying, by one or more processors of the hub, a status of a scheduled or unscheduled task prior to the power outage based on previously stored data relating to the status of the scheduled or unscheduled task; and
determining, by one or more processors of the hub, a next task based on a normal task cycle of the scheduled or unscheduled task.

5. The computer-implemented method of claim 1, further comprising:
upon determining that the electrically powered device is unable to automatically perform the expected activity to resume the task associated with the electrically powered device, transmitting, by one or more processors of the hub, a summary notification to a mobile device of a user, wherein the summary notification includes the expected activity to resume the task associated with the electrically powered device.

6. The computer-implemented method of claim 5, wherein the summary notification further includes:
an identification of the electrically powered device affected by the power outage;
a status of the electrically powered device before the power outage occurred;
a relative distance of the electrically powered device from the user; and
a recommendation to perform the expected activity.

7. The method of claim 6, wherein the summary notification further includes an identification of a human that is within a certain proximity of the electrically powered device.

8. A computer program product comprising:
one or more computer readable storage media and program instructions stored on the one or more computer readable storage media, wherein the one or more computer readable storage media are not transitory signals per se, the stored program instructions comprising:

program instructions to provide a hub connected to an electrically powered device, wherein the hub is powered by an uninterruptible power source, and wherein the hub is adapted to monitor one or more sensors attached to the electrically powered device;

program instructions to continually record data regarding the operational state of the electrically powered device using the one or more sensors attached to the electrically powered device;

program instructions to track progress of one or more tasks associated with the electrically powered device, based on the continual recording of data regarding the operational state of the electrically powered device;

program instructions to, upon detecting a power outage followed by a restore of power, identify an expected activity to resume a task associated with the electrically powered device, based on the tracked progress of the task prior to the power outage;

program instructions to instruct the electrically powered device to perform the expected activity to resume the task;

program instructions to determine trends relating to the electrically powered device using data analytics and statistical modeling, wherein the trends include times during the day when power outages frequently occur, times during the day when power outages are least likely to occur, and whether the electrically powered device is able to automatically recover from power outages without human intervention;

program instructions to perform a survival analysis to identify an amount of time until an occurrence of a power outage for the electrically powered device;

program instructions to determine a best time of day for the electrically powered device to operate, based, at least in part, on the determined trends; and program instructions to schedule the electrically powered device to operate at the determined best time of day.

9. The computer program product of claim 8, wherein the data regarding the operational state of the electrically powered device includes: a device type of the electrically powered device, a selected mode of operation of the electrically powered device, a start time of a selected task of the one or more tasks, and an expected end time for the selected task.

10. The computer program product of claim 8, wherein the program instructions to track progress of one or more tasks associated with the electrically powered device, based on the continual recording of data regarding the operational state of the electrically powered device comprise:

program instructions to detect a scheduled or unscheduled task on the electrically powered device;

program instructions to monitor updated data relating to a status of the scheduled or unscheduled task; and program instructions to, in response to determining that the updated data relating to the of the scheduled or unscheduled task is different from stored data relating to the status of the scheduled or unscheduled task, update the stored data relating to the status of the scheduled or unscheduled task to reflect the updated data.

11. The computer program product of claim 8, wherein the program instructions to identify an expected activity to resume a task associated with the electrically powered device, based on the tracked progress of the task prior to the power outage, comprise:

program instructions to identify a status of a scheduled or unscheduled task prior to the power outage based on previously stored data relating to the status of the scheduled or unscheduled task; and program instructions to determine a next task based on a normal task cycle of the scheduled or unscheduled task.

12. The computer program product of claim 8, the stored program instructions further comprising:

program instructions to, upon determining that the electrically powered device is unable to automatically perform the expected activity to resume the task associated with the electrically powered device, transmit a summary notification to a mobile device of a user, wherein the summary notification includes the expected activity to resume the task associated with the electrically powered device.

13. The computer program product of claim 12, wherein the summary notification further includes:

an identification of the electrically powered device affected by the power outage;

a status of the electrically powered device before the power outage occurred;

a relative distance of the electrically powered device from the user; and a recommendation to perform the expected activity.

14. The computer program product of claim 13, wherein the summary notification further includes an identification of a human that is within a certain proximity of the electrically powered device.

15. A computer system comprising:

one or more computer processors;

one or more computer readable storage media;

program instructions stored on the computer readable storage media for execution by at least one of the one or more processors, the stored program instructions comprising:

program instructions to provide a hub connected to an electrically powered device, wherein the hub is powered by an uninterruptible power source, and wherein the hub is adapted to monitor one or more sensors attached to the electrically powered device;

program instructions to continually record data regarding the operational state of the electrically powered device using the one or more sensors attached to the electrically powered device;

program instructions to track progress of one or more tasks associated with the electrically powered device, based on the continual recording of data regarding the operational state of the electrically powered device;

program instructions to, upon detecting a power outage followed by a restore of power, identify an expected activity to resume a task associated with the electrically powered device, based on the tracked progress of the task prior to the power outage;

program instructions to instruct the electrically powered device to perform the expected activity to resume the task;

program instructions to determine trends relating to the electrically powered device using data analytics and statistical modeling, wherein the trends include times during the day when power outages frequently occur, times during the day when power outages are least likely to occur, and whether the electrically powered device is able to automatically recover from power outages without human intervention;

program instructions to perform a survival analysis to identify an amount of time until an occurrence of a power outage for the electrically powered device;

program instructions to determine a best time of day for the electrically powered device to operate, based, at least in part, on the determined trends; and program instructions to schedule the electrically powered device to operate at the determined best time of day.

16. The computer system of claim 15, wherein the data regarding the operational state of the electrically powered device includes: a device type of the electrically powered device, a selected mode of operation of the electrically powered device, a start time of a selected task of the one or more tasks, and an expected end time for the selected task.

17. The computer system of claim 15, wherein the program instructions to track progress of one or more tasks associated with the electrically powered device, based on the continual recording of data regarding the operational state of the electrically powered device comprise:

program instructions to detect a scheduled or unscheduled task on the electrically powered device;

program instructions to monitor updated data relating to a status of the scheduled or unscheduled task; and program instructions to, in response to determining that the updated data relating to the of the scheduled or unscheduled task is different from stored data relating to the status of the scheduled or unscheduled task, update the stored data relating to the status of the scheduled or unscheduled task to reflect the updated data.

18. The computer system of claim 15, wherein the program instructions to identify an expected activity to resume a task associated with the electrically powered device, based on the tracked progress of the task prior to the power outage, comprise:

program instructions to identify a status of a scheduled or unscheduled task prior to the power outage based on previously stored data relating to the status of the scheduled or unscheduled task; and program instructions to determine a next task based on a normal task cycle of the scheduled or unscheduled task.

19. The computer system of claim 15, the stored program instructions further comprising:

program instructions to, upon determining that the electrically powered device is unable to automatically perform the expected activity to resume the task associated with the electrically powered device, transmit a summary notification to a mobile device of a user, wherein the summary notification includes the expected activity to resume the task associated with the electrically powered device.

20. The computer system of claim 19, wherein the summary notification further includes an identification of a human that is within a certain proximity of the electrically powered device.

* * * * *